United States Patent
Barfoot et al.

(10) Patent No.: US 11,181,346 B1
(45) Date of Patent: Nov. 23, 2021

(54) METHODS FOR ENHANCED SOFT-KILL COUNTERMEASURE USING A TRACKING RADAR

(71) Applicant: BAE Systems Information and Electronic Systems Integration Inc., Nashua, NH (US)

(72) Inventors: David A. Barfoot, Austin, TX (US); Will R. Grigsby, Austin, TX (US); Karl P. Herb, Austin, TX (US); Eric C. Hoenes, Austin, TX (US); Somit S. Mathur, Austin, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 221 days.

(21) Appl. No.: 16/588,388

(22) Filed: Sep. 30, 2019

(51) Int. Cl.
*F41H 11/02* (2006.01)
*F41G 7/22* (2006.01)
*G01S 13/72* (2006.01)
*G01S 13/00* (2006.01)

(52) U.S. Cl.
CPC .......... *F41H 11/02* (2013.01); *F41G 7/2246* (2013.01); *F41G 7/2293* (2013.01); *G01S 13/723* (2013.01)

(58) Field of Classification Search
CPC ..................................................... F41H 13/005
See application file for complete search history.

(56) References Cited

U.S. PATENT DOCUMENTS

| 4,179,088 | A  | * | 12/1979 | French | F41G 7/2293 |
|   |   |   |   |   | 244/3.14 |
| 7,916,065 | B1 | * | 3/2011 | Mintz | F41H 11/02 |
|   |   |   |   |   | 342/13 |
| 8,258,998 | B2 |   | 9/2012 | Factor et al. |   |
| 8,464,949 | B2 |   | 6/2013 | Namey et al. |   |
| 9,632,168 | B2 | * | 4/2017 | Moraites | F41H 13/005 |
| 2005/0150371 | A1 | * | 7/2005 | Rickard | F41H 11/02 |
|   |   |   |   |   | 89/1.11 |
| 2009/0084253 | A1 | * | 4/2009 | Bellino | F41H 11/02 |
|   |   |   |   |   | 89/1.51 |
| 2009/0158954 | A1 |   | 6/2009 | Wardecki et al. |   |
| 2012/0055990 | A1 | * | 3/2012 | Weiss | F41H 11/02 |
|   |   |   |   |   | 235/412 |
| 2014/0102288 | A1 |   | 4/2014 | Yeshurun et al. |   |

FOREIGN PATENT DOCUMENTS

| EP | 2959260 |   | 10/2019 |   |   |
| GB | 2342983 | A | * | 4/2000 | ............. F41H 11/02 |
| GB | 2354312 | A | * | 3/2001 | ............. F41H 11/02 |
| GB | 2519785 | A | * | 5/2015 | ............. F41H 11/02 |

* cited by examiner

Primary Examiner — Bernarr E Gregory
(74) Attorney, Agent, or Firm — Sand, Sebolt & Wernow LPA

(57) ABSTRACT

A soft-kill countermeasure system utilizing a tracking radar to enhance existing countermeasures and enable new countermeasures to be utilized to combat the ever evolving and increasing sophistication of threats. The use of the tracking radar may further allow for immediate threat defeat confirmation which may allow for rapid or immediate redirection of the countermeasure system to address additional simultaneous threats.

20 Claims, 9 Drawing Sheets

METHODS FOR ENHANCED SOFT-KILL COUNTERMEASURE USING A TRACKING RADAR

TECHNICAL FIELD

The present disclosure relates generally to the field of electronic warfare countermeasures. More particularly, in one example, the present disclosure relates to electronic warfare countermeasures utilizing a tracking radar. Specifically, in another example, the present disclosure relates to an electronic warfare countermeasure system and process utilizing a tracking radar to enhance the effectiveness of soft-kill countermeasures.

BACKGROUND

Electronic warfare (EW) is one of many facets of modern military operations. Specifically, EW is the observation and use of the electromagnetic spectrum, including actions to detect, evade, attack, or impede enemy vehicles or installations that likewise broadcast or operate within the electromagnetic spectrum. The general purpose of EW is to utilize the electromagnetic spectrum to obtain an advantage for operations in neutral or contested environments, and for defense in friendly environments. EW may be applied from multiple platforms ranging across all frequencies of the electromagnetic spectrum and may be utilized in air, sea, land, and/or space operations by both manned and unmanned systems.

As it relates to threats or more particularly to threat avoidance, EW is particularly useful in or when integrated with both hard-kill and soft-kill countermeasure systems.

Modern military vehicles, including tanks, personnel carriers, trucks, aircraft, and/or ships, face ever increasing threats as they operate in hostile areas. Commonly, these threats include guided munitions, such as a missile or other warhead carrying projectile, which are launched from small, highly portable launch platforms. These guided projectiles are becoming increasingly difficult to counter as they evolve to utilize more sophisticated guidance and tracking systems.

Currently, standard countermeasures typically fall into one of two categories, namely, hard-kill countermeasures and soft-kill countermeasures. Hard-kill countermeasures include any defensive action that fires or otherwise launches a counter projectile towards the incoming threat in an effort to physically destroy the threat. This may include countering the incoming threat with a similar counter action such as firing a missile at an incoming missile. As hard-kill countermeasures typically require a direct impact or very close proximity to the incoming threat, these systems tend to utilize a tracking radar to both locate and track the incoming threat as it moves toward its target. The use of this tracking radar then may allow the hard-kill countermeasure to be directed to the appropriate spot to intercept threat.

Soft-kill countermeasures, on the other hand, utilize the electromagnetic spectrum and/or electromagnetic energy to impair the incoming threat's ability to accurately reach its target. Current soft-kill countermeasures may include actions such as signal jamming, deploying flares, deploying chaff, or other such measures to confuse the guidance system of the incoming threat to further direct it away from its target or allow the target vehicle an opportunity to evade the incoming threat. Soft-kill countermeasures typically do not include any form of tracking systems, instead relying on optical sensors which detect a missile launch and provide the threat's original launch location. In some instances, this information allows the soft-kill countermeasure to counter and redirect the incoming threat by affecting the guidance system co-located with the missile launcher. Typically, these soft-kill countermeasures require a period of time to pass between threat detection and effective threat avoidance. Further, with soft-kill countermeasures, it is often not confirmed whether or not the threat was successfully avoided until an impact does or does not occur. Put another way, for example, a soft-kill countermeasure opposing an incoming guided missile may not provide a confirmation that the threat has been defeated or successfully avoided until the elapsed time after the missile launch has exceeded the maximum flight time of the missile. This may leave target vehicles vulnerable to simultaneous threats from various directions, as well as may result in an unsuccessful avoidance attempt that will not be determined until the threat impacts its target.

Further, as these threats evolve in their ability to be fired or launched from easily concealed and portable platforms, the time in which the target has to respond and counteract these threats is decreasing. Accordingly, soft-kill countermeasures are becoming less effective, particularly in areas where multiple threats may be simultaneously present.

SUMMARY

The present disclosure addresses these and other issues by providing a soft-kill countermeasure system utilizing a tracking radar to enhance existing countermeasures and enable new countermeasures to be utilized to combat the ever evolving and increasing sophistication of threats. The use of the tracking radar may further allow for immediate threat defeat confirmation which may allow for rapid or immediate redirection of the countermeasure system to address additional simultaneous threats.

In one aspect, an exemplary embodiment of the present disclosure may provide a soft-kill countermeasure system comprising: a queueing sensor operable to detect a launch of a projectile; a tracking radar having one or more antenna elements operable to locate and track the projectile; a processor in operative communication with the queueing sensor and tracking radar operable to determine a category and type of threat posed by the projectile from data collected by the tracking radar; and a beam generator operable to generate a beam of electromagnetic energy configured to counter the threat posed by the projectile; wherein the beam generator directs the beam to a spot on a ground surface away from a ground target to divert the projectile. This exemplary embodiment or another exemplary embodiment may further provide wherein the spot is a decoy spot forward of the projectile and the beam simulates a laser designator to divert the projectile to the decoy spot. This exemplary embodiment or another exemplary embodiment may further provide the beam generator directs the beam to a spot on a ground surface wherein the spot is behind the projectile and the beam generates a backscatter to divert the projectile. This exemplary embodiment or another exemplary embodiment may further provide wherein the tracking radar is operable to communicate the position of the projectile and at least one of the elevation, velocity, flight pattern, spin rate, control surfaces, cross-section, and size of the projectile to the processor. This exemplary embodiment or another exemplary embodiment may further provide wherein the processor is further operable to compare the position of the projectile and the at least one of the elevation, velocity, flight pattern, spin rate, control surfaces, cross-section, and size of the projectile to a database of known threat types to determine the category and type of threat posed by the projectile.

This exemplary embodiment or another exemplary embodiment may further provide wherein the processor is further operable to direct the beam generator to generate the beam of electromagnetic energy configured to counter the threat posed by the projectile automatically. This exemplary embodiment or another exemplary embodiment may further provide wherein the queueing sensor further comprises: an optical sensor operable to detect a muzzle flash from the launch of the projectile. This exemplary embodiment or another exemplary embodiment may further provide wherein the beam generator is further operable to generate the beam of electromagnetic energy in multiple bands of the electromagnetic spectrum. This exemplary embodiment or another exemplary embodiment may further provide wherein the tracking radar is operable to detect an effectiveness of the beam to divert the projectile. This exemplary embodiment or another exemplary embodiment may further provide wherein the beam generator further comprises: a movable mounting system operable to move the beam generator to a plurality of positions relative to the mounting system. This exemplary embodiment or another exemplary embodiment may further provide wherein the laser beam is projectable in any direction relative to the mounting system of the beam generator. This exemplary embodiment or another exemplary embodiment may further provide wherein the laser beam is automatically generated in response to the threat posed by a projectile according to the determination of the threat category and threat type by the processor.

In another aspect, an exemplary embodiment of the present disclosure may provide a method of deploying a soft-kill countermeasure comprising: detecting the launch of a threat via a queueing sensor; tracking the position of the threat via a tracking radar; communicating the position of the threat and at least one of the elevation, velocity, flight pattern, spin rate, control surfaces, cross-section, and size of the threat to a processor; determining, via the processor, the threat type according to the at least one of the elevation, velocity, flight pattern, spin rate, control surfaces, cross-section, and size of the threat; determining, via the processor a chosen countermeasure to be deployed according to the threat type and position of the threat; deploying the chosen countermeasure; evaluating the chosen countermeasure for effectiveness via the tracking radar; and deploying a different countermeasure if the chosen countermeasure is ineffective. This exemplary embodiment or another exemplary embodiment may further provide wherein deploying the chosen countermeasure further comprises: generating a beam of electromagnetic energy configured to counter the identified threat type via a beam generator. This exemplary embodiment or another exemplary embodiment may further provide detecting a second threat via the queueing sensor; determining a threat type of the second threat via the tracking radar and processor; reconfiguring the beam of electromagnetic energy according to the second threat type; and redeploying the reconfigured beam of electromagnetic energy to a second position to counter the second threat. This exemplary embodiment or another exemplary embodiment may further provide wherein reconfiguring the beam of electromagnetic energy further comprises: adjusting one of the wavelength, frequency, size, position, and polarization of the beam. This exemplary embodiment or another exemplary embodiment may further provide directing a beam to a spot on a ground surface away from a ground vehicle to divert the threat. This exemplary embodiment or another exemplary embodiment may further provide wherein tracking the threat via the tracking radar and communicating the position of the threat and the at least one of the elevation, velocity, flight pattern, spin rate, control surfaces, cross-section, and size of the threat to the processor is accomplished in real time.

In yet another aspect, an exemplary embodiment of the present disclosure may provide a soft-kill countermeasure system comprising: a queueing sensor operable to detect a launch of a threat; a tracking radar operable to locate and track the threat; a processor in operative communication with the queueing sensor and tracking radar operable to determine a category and type of threat; and a soft-kill countermeasure configured to counter the threat. This exemplary embodiment or another exemplary embodiment may further provide wherein the tracking radar is operable to detect a successful defeat of the threat.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
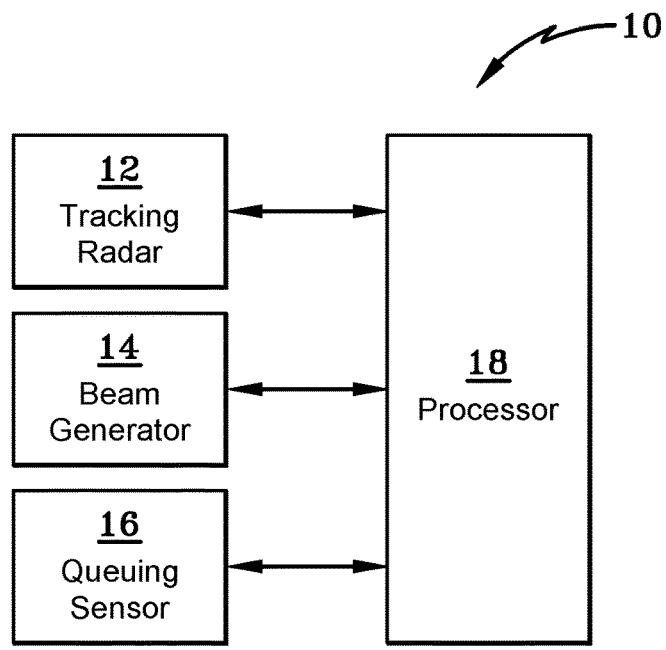
FIG. 1 (FIG. 1) is a schematic view of an exemplary countermeasure system of the present disclosure.
Figure 2:
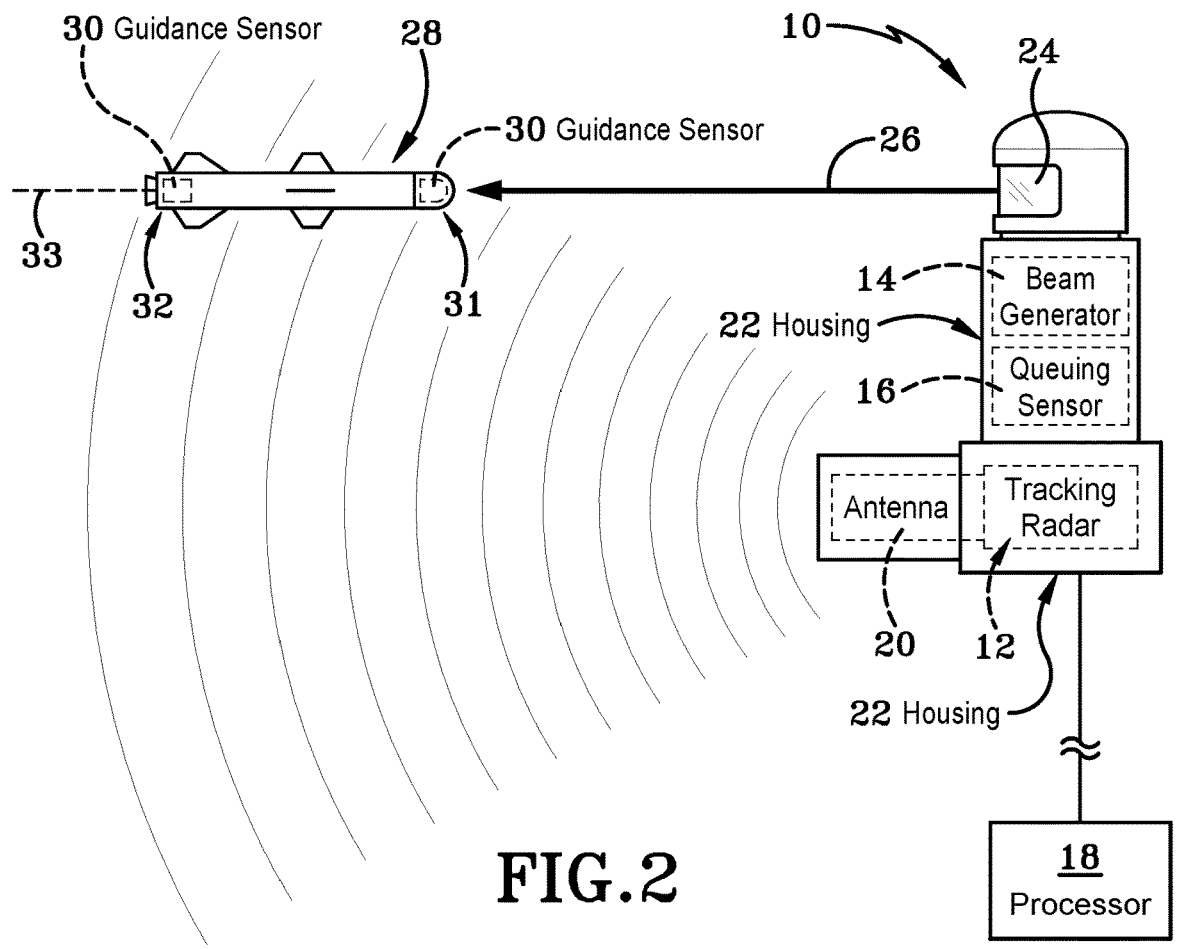
FIG. 2 (FIG. 2) is an operational view of an exemplary countermeasure system of the present disclosure.

With reference to FIGS. 1 and 2, an enhanced soft-kill countermeasure system utilizing tracking radar is shown and generally indicated as countermeasure system 10. Countermeasure system 10 may include a tracking radar 12, a beam generator 14, a queuing sensor 16, and a processor 18. These countermeasure system 10 components, namely, tracking radar 12, beam generator 14, queuing sensor 16, and/or processor 18, may generally be referred to herein as assets. Therefore, it will be understood that the term assets, as used herein, may refer to any or all of these components unless specifically stated otherwise. Countermeasure system 10 may have a housing generally indicated as 22 which may contain any or all of the countermeasure system 10 assets therein. For example, housing 22, may contain the tracking radar 12 and components thereof, beam generator 14, queuing sensor 16 and/or processor 18 therein. The housing 22 may be any suitable size or shape as dictated by the desired implementation and may be constructed of any suitable material, including but not limited to metals, plastics, resins, or similar materials, or any suitable combination of materials. According to another aspect, housing 22 may be omitted. According to yet another aspect, the assets and components of countermeasure system 10 may be carried within, on, or by an associated vehicle, such as vehicle 21 as discussed further herein. According to this aspect, the assets of countermeasure system 10 may be internal to the vehicle 21 and/or housing 22 may be formed as part of vehicle 21.

Tracking radar 12 may be any suitable radar system capable of sending and/or receiving radar signals. Tracking radar 12 may further include one or more antennas 20 which may be an antenna array including one or more transmit and/or receiving antennas 20 as dictated by the desired implementation. These antennas 20 may be monopole, dipole, and/or directional antennas, or any combination thereof, and may be arranged in any desired configuration appropriate for the installation conditions. According to one aspect, each of these antennas 20 may be a separate antenna array having multiple antenna elements or antennas contained therein.

Tracking radar 12 may further include or utilize one or more transceivers (not shown) which may be operable to transmit and/or receive radio waves via the antennas 20. According to this aspect, transceiver may include any type of transmitter, including but not limited to communications transmitters, radar transmitters, or signal jamming transmitters. Similarly, a transceiver may include any type of receiver, including but not limited to radio receivers, global navigation receivers, or very high frequency omni-direction range (VOR) receivers. According to another aspect, such a transceiver may include more than one type of transmitter and/or receiver therein.

Tracking radar 12 may be a legacy radar system that may exist with hard-kill countermeasure systems that may be further integrated within the present soft-kill countermeasure system 10, as discussed below. According to another aspect, tracking radar 12 may be a dedicated and independent radar system for use with the present countermeasure system 10.

Beam generator 14 may be any suitable beam generator operable to produce a beam of electromagnetic energy across multiple wavelengths of the electromagnetic spectrum. For example, beam generator 14 may be a laser generator operable to generate laser beams (such as beam 26 discussed below) of varying wavelengths and/or colors. Beam generator 14 may be a part of or may further include a beam director assembly (BDA) (not shown) which may include additional optical components 24, such as lens, mirrors, collimators, divergers, or any other suitable optical component 24 operable to allow a beam 26 generated from the beam generator 14 to be directed, projected, and/or, moved to a desired location(s), as discussed further herein.

According to one aspect, beam generator 14 may be movably or rotationally mounted within or to housing 22 such that beam 26 may be projected from beam generator 14 in any direction or position relative to the beam generator 14 and/or the countermeasure system 10. According to one aspect, beam generator 14 may be gimbal mounted to allow 360° rotation around the azimuth as well as across a suitable range of elevational movements to allow a beam 26 to be projected in any direction relative to countermeasure system 10.

Beam 26 may be any suitable beam operable to perform the desired functions as discussed further herein. For example, according to one implementation, beam 26 may be generated by a semiconductor and may be a diode laser, a solid state laser, distributed feedback laser, gas laser, or chemical laser. According to another aspect, beam generator 14 may include multiple lasers, each emitting a different wavelength, which may be combined into a single, collimated beam 26. Beam generator 14 and beam 26 may further be variable, depending upon the desired implementation and the particular needs of countermeasure system 10 to counter a threat 28 as discussed further herein. Accordingly, it will be understood and contemplated that beam generator 14 and beam 26 as used herein may be any suitable beam generator 14 and beam 26 combination according to the specific objectives of the implementation thereof.

Queuing sensor 16 may be an optical sensor which is operable across multiple electromagnetic wavelengths of light, including ultraviolet, visible, infrared, and the like. Queuing sensor 16 may be a camera, focal plane array, or any other suitable visual or optical sensor that may be operable to detect the launch of a threat 28 against a vehicle 21 carrying countermeasure system 10 as discussed further herein. According to another aspect, queuing sensor 16 may have and/or utilize more than one of these visual or optical sensors. According to another aspect, queuing sensor 16 may include additional components or sensors, such as a laser warning receiver, a radio frequency (RF) receiver, or other similar sensors.

Processor 18 may be a computer processor, logic or series of logics, including therewith or in further communication with, one or more non-transitory storage mediums. The processor 18 may be capable of carrying out and executing a set of instructions or processes encoded thereon as further discussed herein. According to one aspect, processor 18 may be operationally connected to the other assets directly and/or indirectly and may be in further communication therewith. According to another aspect, processor 18 may be remote from the other countermeasure system 10 assets and may be in wired or wireless communication therewith. The particular connectivity and communication between processor 18 and other countermeasure system 10 assets may vary depending upon the desired implementation and installation parameters of countermeasure system 10 as discussed further herein.

Countermeasure system 10, as discussed previously herein, may be carried on a vehicle 21, which may be any type of suitable vehicle including land-based vehicles, manned or unmanned aircraft, and/or ships. It will be understood that countermeasure system 10 and the methods described herein may be readily adapted for use with multiple vehicle types. For purposes of clarity, as discussed and used further herein, the exemplary vehicle will be vehicle 21 which is depicted in the remaining figures as a land-based vehicle, such as a tank. Further, as used below, vehicle 21 may be described as a target 40 or target vehicle 40. References of this type are to be understood as equally applicable to all vehicle 21 types. Further, references to target 40 may also include other target types, including stationary land targets, such as buildings or radar installations. It will therefore be understood that the countermeasure system 10 of the present disclosure may be installed and applied from any suitable platform deemed desirable to protect from threats 28, as described herein.

Assets of countermeasure system 10 are illustrated throughout the figures in a generalized configuration and position; however, it will be understood that each individual asset may be placed and/or located at any position within or on vehicle 21. Accordingly, it will be understood that the particulars of the vehicle 21, (or other structure) on or with which countermeasure system 10 is carried or otherwise installed, may dictate the positioning and/or placement of individual assets thereon. The number, size, and type of assets employed may likewise vary depending on the specific platform employed and may be limited by the available space thereon as well as the load capacity of an individual vehicle 21. According to another aspect, assets may be moved or moveable between multiple positions depending upon the desired use for a specific mission or operation or as dictated by the particulars of the vehicle being used as discussed further herein. The specific configuration and placement of countermeasure system 10 assets on a vehicle 21 is therefore considered to be the architecture of the countermeasure system 10 and may be specifically and carefully planned to meet the needs of any particular countermeasure system 10. The architecture thereof may also be changed or upgraded as needed.

Further, according to one aspect, the processes and systems described herein may be adapted for use with legacy systems, i.e., existing architecture, without a need to change or upgrade such systems. According to another aspect, certain assets may be legacy assets while other assets may be retrofitted for compatibility with legacy assets to complete or otherwise enhance countermeasure system 10 as discussed further herein.

As countermeasure system 10 is understood to be a defensive measure for a vehicle 21, such as a target vehicle 40, it is contemplated that vehicle 21 is likely to be the type operated in a hostile environment and may be subjected to varying threat levels, depending upon the particulars of the operation. Accordingly, it will be understood that countermeasure system 10 may utilize redundant or duplicative assets to maintain the functionality in the event of damage or loss of countermeasure system 10 components.

Having thus described the general configuration and components of countermeasure system 10, the operation and methods of use thereof will now be discussed.

With reference to FIG. 2, the general operation of countermeasure system 10 involves utilizing a beam of electromagnetic energy, indicated as beam 26, as a soft-kill countermeasure to counter a threat 28. Threat 28 may be a projectile that may include guided projectiles or munitions, such as missiles, rocket propelled grenades, or the like. Typically, these threats 28 include one or more guidance sensors 30 disposed either in the nose 31 or tail 32 regions of the threat 28. As depicted and discussed herein, threat 28 may be a guided missile; however, it will be understood that references to threat 28 could refer to any type of threat that may be faced by a target vehicle 21.

Guidance sensor 30 may be any suitable sensor, including optical sensors, which are typically employed with guided munitions to allow the specific threat 28 to be directed to its intended target 40. Guidance sensors 30 may interact with a guidance signal 33 that is typically produced from a source remote from the threat 28 itself, such as from a launcher 34 as discussed further herein.

At its most basic level of operation, countermeasure system 10 may interfere with the guidance sensor 30, the guidance signal 33, a signal generator 36 (i.e. the component generating the specific guidance signal 33), and/or one or more guide optics 38 (e.g. optical components used to visualize the position of threat 28 relative to its target 40) to attempt to neutralize the threat 28 by causing incorrect guidance commands to be sent to the threat 28 resulting in defeat of the threat 28, or in an attempt to cause the threat 28 to miss the target 40 by reducing the accuracy and ability of the threat 28 to maintain an accurate course to the target 40. A successful defeat of threat 28 may be realized as a successful attempt to redirect threat 28 away from a target 40, a detonation of the threat 28 away from the target 40, or the like as discussed further herein with reference to specific countermeasures.

With reference to FIGS. 3-7, threat 28 may be generally categorized by its method of guidance from a launcher 34 towards a target 40, such as vehicle 21. The successful defeat of threat 28 as contemplated herein may therefore vary depending upon which category, or more particularly which guidance type, threat 28 utilizes to steer itself towards target 40.

Figure 3:
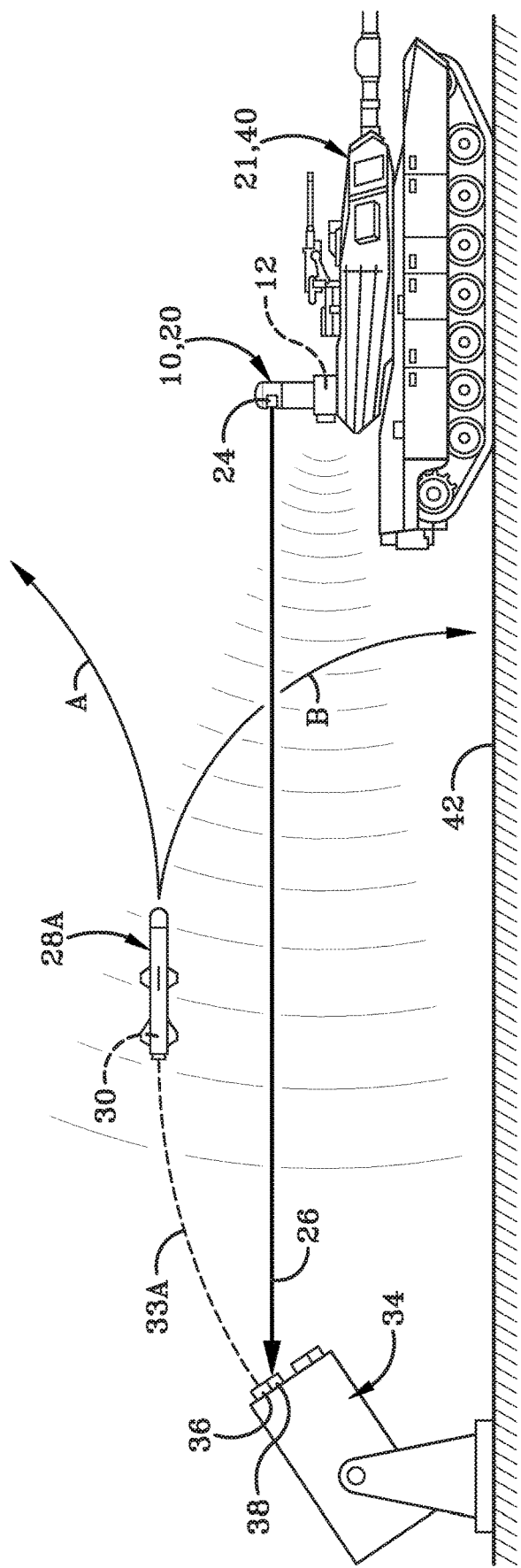
FIG. 3 (FIG. 3) is an operational view of an exemplary countermeasure system of the present disclosure engaged with a first threat type.

With reference to FIG. 3, a first category of threat 28 may utilize a guidance method typically referred to as semi-automatic command to line-of-sight (SACLOS) guidance. For this particular type of threat, indicated as threat 28A, utilizing SACLOS guidance method typically involves a missile tracking system or tracker containing a guide optic 38 co-located with a launcher 34. The guide optic is typically operable to track the location of the threat 28A relative to the target 40 via a beacon (such as a pyrotechnic flare, flashlamp, or the like—not shown in the figures but understood to be a common component of SACLOS threats 28A) carried by the threat 28A before sending guidance commands from a signal generator 36 (also co-located with the launcher 34) to the threat 28A. This guidance signal 33 sent from the launcher 34 to the threat 28A is received by guidance sensor 30, typically disposed on the tail 32 of threat 28A to keep the threat 28A aligned with the target vehicle 21. In countering threat 28A, countermeasure system 10 may detect the launch of the threat 28A and may emit a countermeasure beam, such as beam 26, to the launcher 34, or more particularly into the guide optics 38 of the missile tracking system co-located with the launcher 34 to disrupt the guidance system's ability to visualize the location of threat 28A relative to the target 40. In disrupting this visual tracking, the countermeasure system 10 may cause threat 28A to veer off course, for example, in the direction of arrow A in FIG. 3 wherein threat 28A misses the target 40 by overshooting and traveling past the target 40, or by causing threat 28A to be redirected, such as along path indicated by arrow B, into a surface 42 where it may detonate remote from the target 40. In one example, the surface 42 is a ground surface for a ground target, however, references to "ground," as used herein, are intended to refer to a surface 42 on which the target resides whether the "ground" is land or sea and the target 40 is a vehicle or ship.

Figure 4A:
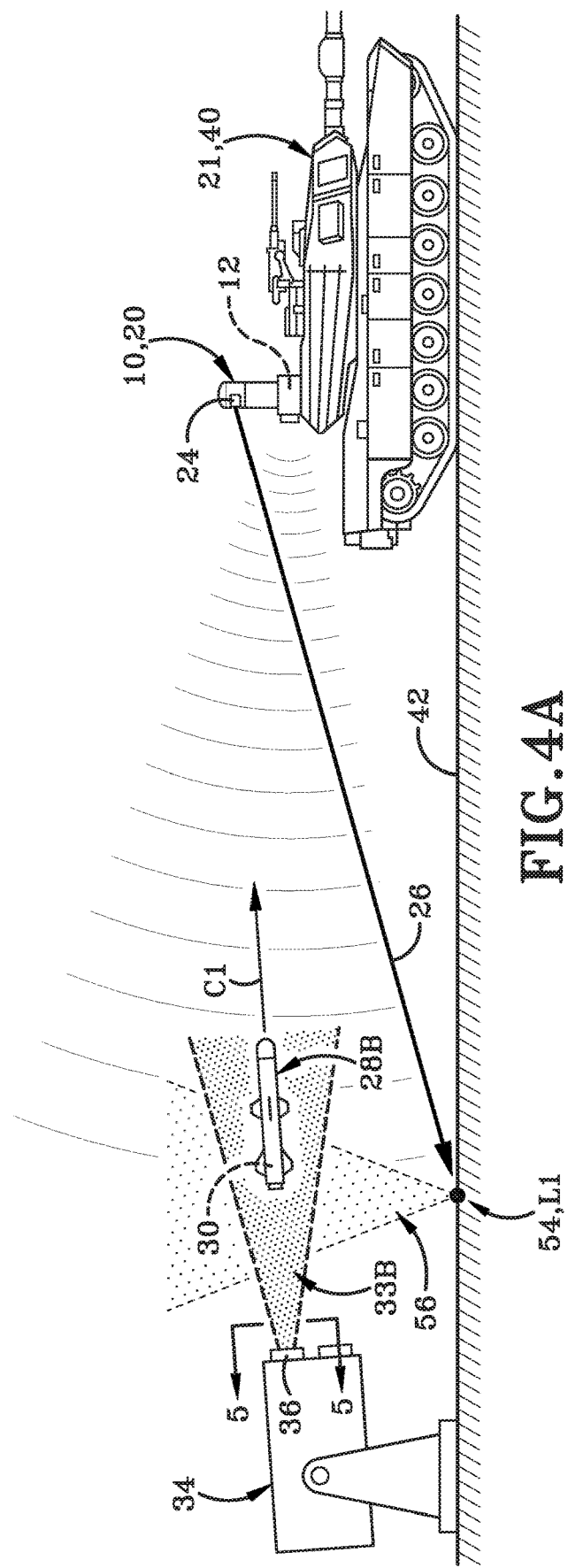
FIG. 4A (FIG. 4A) is an operational view of an exemplary countermeasure system of the present disclosure engaged with a second threat type in a first position.
Figure 4B:
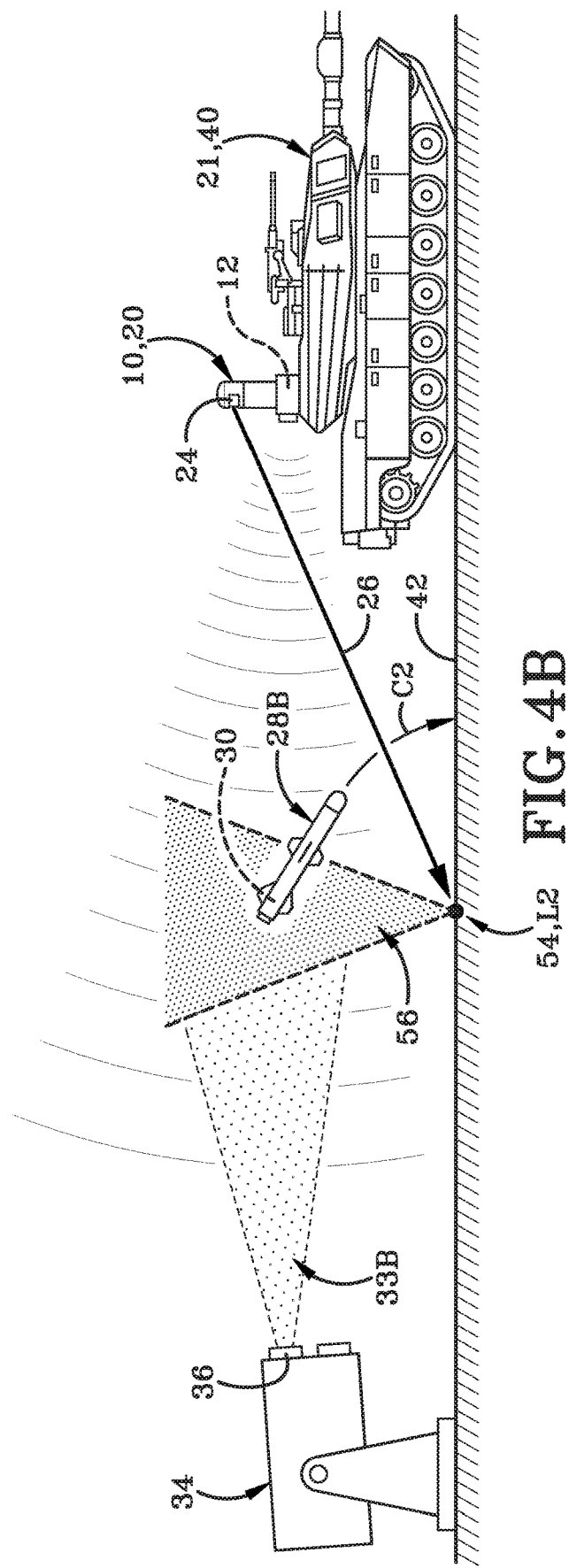
FIG. 4B (FIG. 4B) is an operational view of an exemplary countermeasure system of the present disclosure engaged with the second threat type in a second positon.
Figure 5:
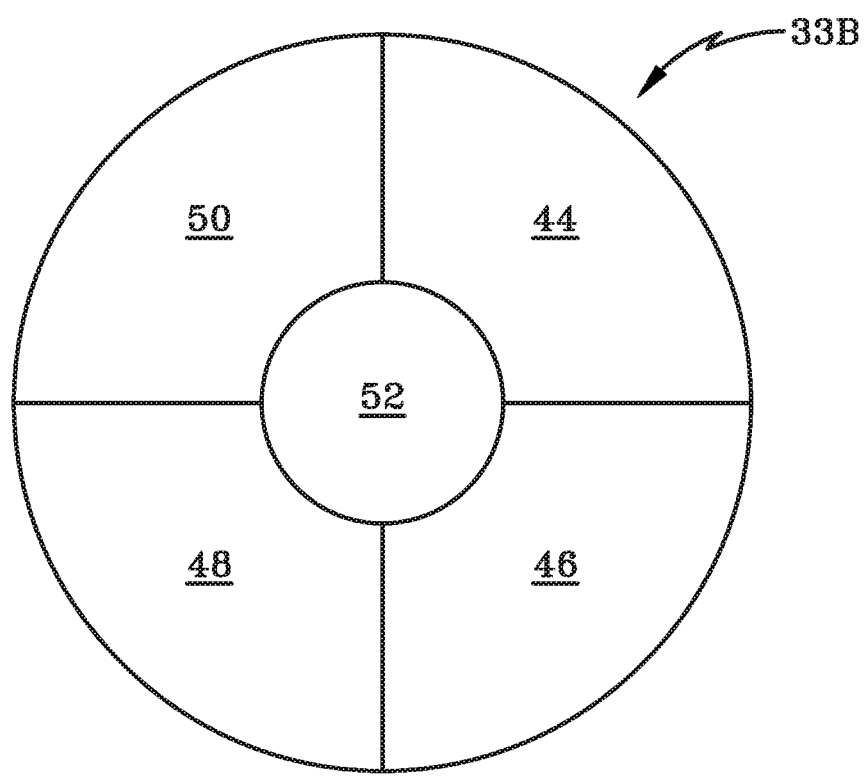
FIG. 5 (FIG. 5) is a cross sectional view of a guidance beam taken along 5-5 from FIG. 4A.

With reference to FIGS. 4A, 4B, and 5, a second type of threat 28B may utilize a second guidance method, typically referred to or known as optical beam riding. A beam riding threat 28B, or optical beam rider 28B, is a type of guided projectile that steers itself towards the target 40 via a heterogeneous optical beam generated from the launcher 34 in the direction of the target vehicle 21. The guidance beam or guidance signal 33B is best illustrated in FIG. 5 and may be segmented into regions consisting of multiple outer regions and a center region. Specifically, as shown in FIG. 5, one example of an optical beam 33B on which a beam riding threat 28B may travel may include a first quadrant 44 indicated as the high right quadrant when viewing the guidance beam 33B from the perspective of the target 40; a second quadrant 46 indicated as the low right quadrant; a third quadrant 48 indicated as the low left quadrant; and fourth quadrant 50 indicated as the high left quadrant. Guidance beam 33B may also include a center region 52 which is the portion of the guidance beam 33B which may be aimed at or otherwise considered "on target" with the target 40. Each quadrant 44, 46, 48, and/or 50 may be distinguishable to the beam rider 28B and/or to the guidance sensor 30 thereon, by way of an optical parameter that is different for each particular quadrant 44, 46, 48, and/or 50. For example, the optical parameter may include one or more of optical frequencies (light wavelength), modulation (intensity, phase, etc.), frequency or code, or polarization. According to one aspect, a beam 33B may have colored regions with each quadrant 44, 46, 48, and 50 corresponding to a different optical wavelength or color of light which may be or include wavelengths in the ultraviolet, visible, and/or infrared bands of the electromagnetic spectrum.

A beam riding threat 28 may then "ride" the guidance signal 33B by utilizing a rear or aft facing guidance sensor 30 disposed in the tail region 32 of threat 28B. Guidance sensor 30 may detect the region or quadrant 44, 46, 48, and/or 50 in which the threat 28B is currently located. Threat 28B may then utilize that information to direct itself back towards the center 52 or "on target" region of the guidance signal 33B, such as in the direction of arrow C1 in FIG. 4A. For example, if the first quadrant 44 utilizes a red light wavelength and the optical sensor 30 detects only red wavelengths, the threat 28B recognizes it is in the high right first quadrant 44 and will redirect itself down and to the left to bring the threat 28B back into the center region 52. By continuously adjusting its flight in this manner, threat 28B may insure it remains on target as it travels between the launcher 34 and the target 40.

Unlike a SACLOS threat 28A, a beam riding threat 28B cannot be defeated by a soft-kill countermeasure wherein beam 26 is directed back at the launcher 34 as there is no guide optic 38 to obscure or otherwise confuse. Similarly, as with SACLOS threats 28A, beam riding threats 28B may not be disrupted by directing beam 26 directly at the threat 28B as the guidance sensor 30 is located in the tail region 32 of the threat 28B and is aft facing. Accordingly, countermeasure system 10 may utilize a technique in which beam 26 is directed at the ground surface 42 immediately behind the threat 28B and a beam spot 54 is generated thereon. This beam spot 54 may generate a backscatter 56 of electromagnetic energy (e.g. light) which may reflect off the ground surface 42 and back into the guidance sensor 30 of threat 28B. This backscatter 56 may overwhelm the guidance signal 33B and may cause threat 28B to redirect in a desired direction, such as along the path indicated by arrow C2 in FIG. 4B and into the ground surface 42. This technique is particularly effective as it is desirable for the guidance system to utilize the weakest possible guidance signal 33B to avoid revealing the location of the launcher to the target 40 or to other observers in the field. Thus, utilizing a beam 26 that is more powerful than the guidance signal 33B may allow the backscatter 56 to rapidly overcome the strength of the guidance signal 33B which may then cause the threat 28B to redirect.

As discussed further below, the specific type of beam riding threat 28B as well as the specific parameters of the guidance signal 33B may be determined via the tracking radar 12 which may reveal or indicate the specific wavelength(s) desired for use with beam 26. For example, where the upper quadrants, such as first quadrant 44 and/or fourth quadrant 50 utilize colored light, beam 26 may be replicated in the same wavelength as one of the upper quadrants 44 and/or 50 to cause the threat 28B to believe it is high of the center region 52 and may cause it to steer downwards along the path indicated by arrow C2 and into the ground surface 42. Since beam 26, and more particularly backscatter 56 coming from the beam spot 54 thereof, may overwhelm the guidance signal 33B and may further not include a center region 52, the threat 28B may be fooled into thinking it is continuously operating high of its intended target path and may constantly steer downwards until it impacts the ground surface 42 away from target 40.

Figure 6:
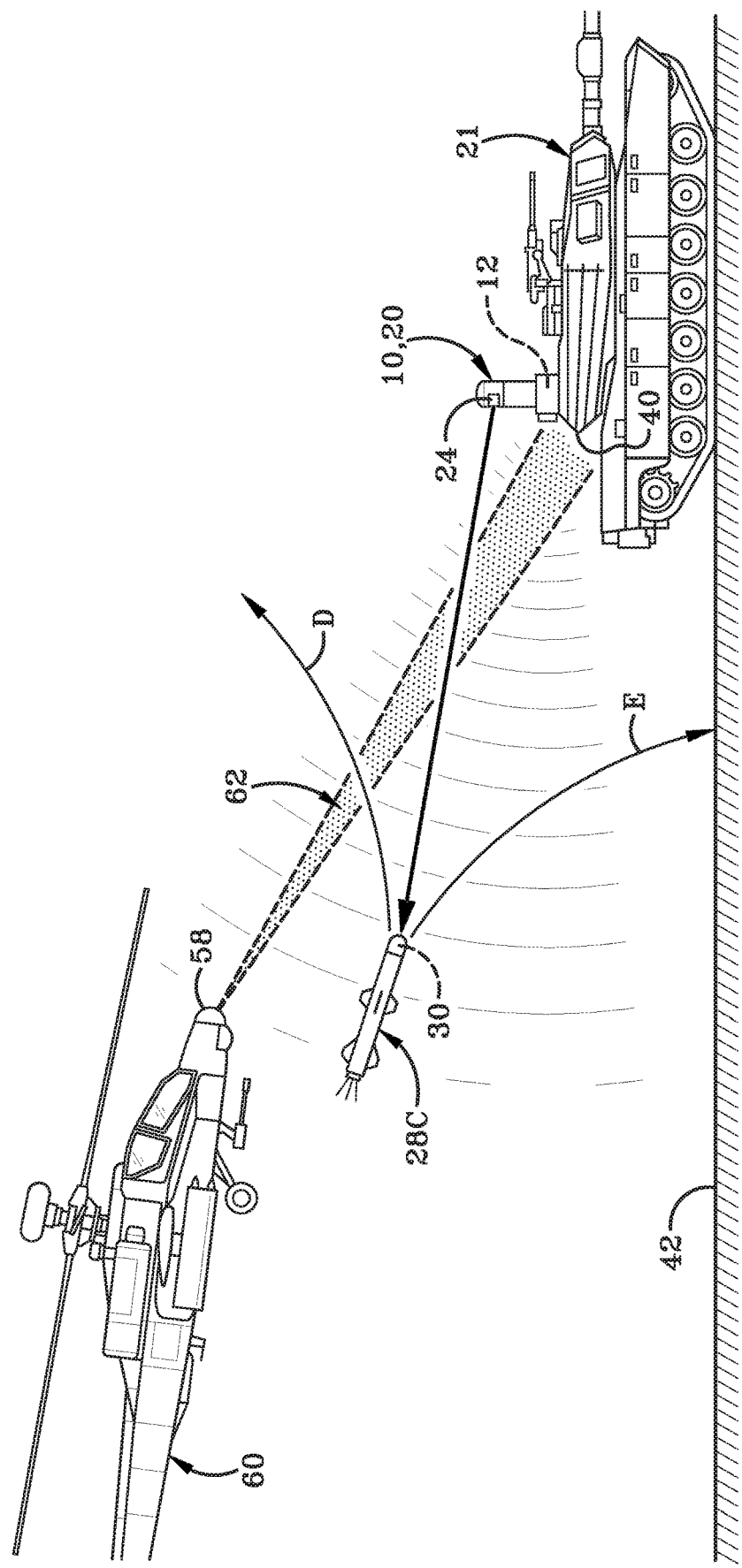
FIG. 6 (FIG. 6) is an operational view of an exemplary countermeasure system of the present disclosure engaged with a third threat type in a first manner.
Figure 7:
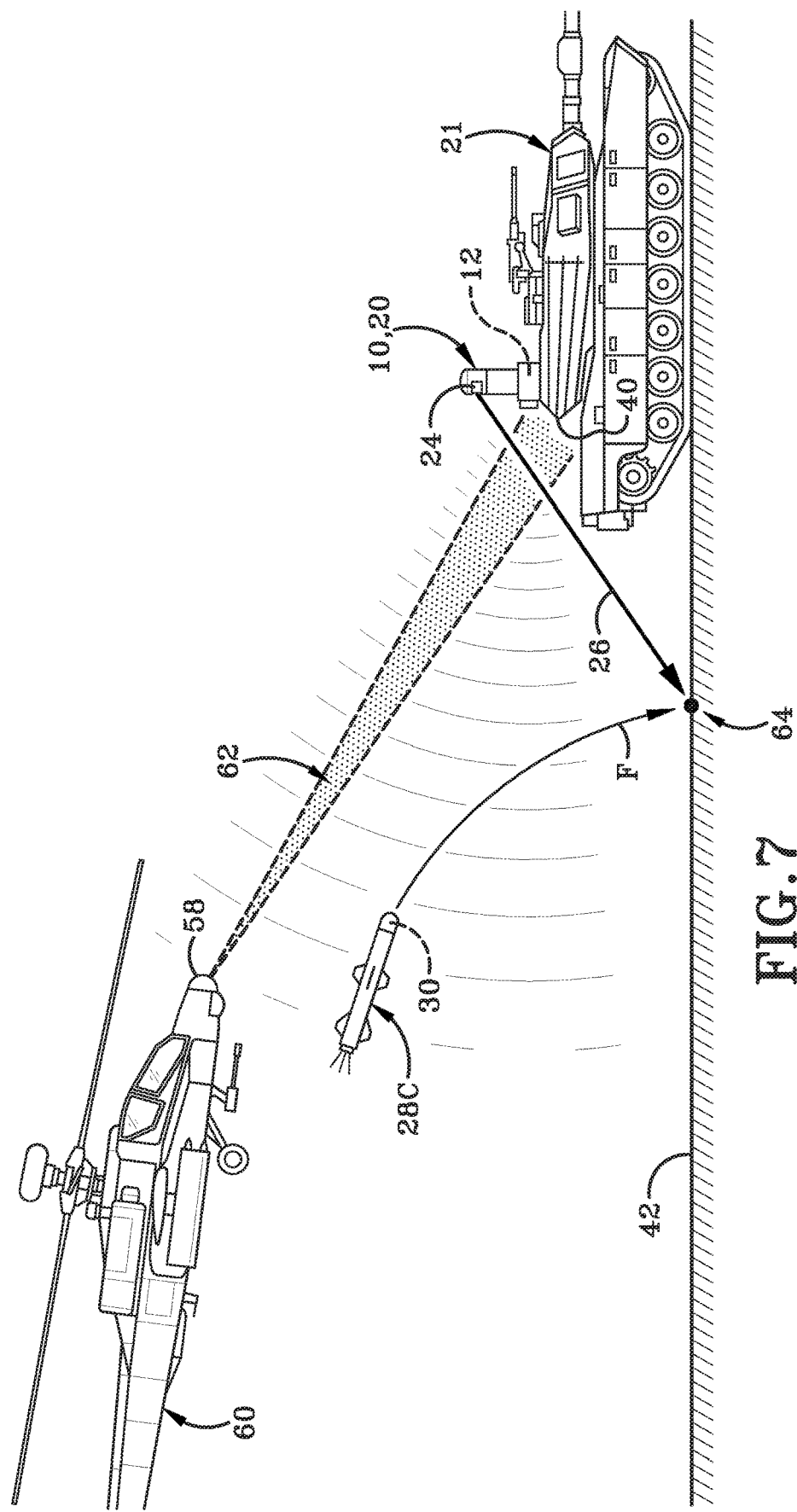
FIG. 7 (FIG. 7) is an operational view of an exemplary countermeasure system of the present disclosure engaged with the third threat type in a second manner.

With reference to FIGS. 6 and 7, a third type of threat, indicated as threat 28C, utilizes a guidance method that does not rely on communication with the launcher 34, but instead utilizes a forward-facing guidance sensor 30 disposed in or around the nose 31 of the threat 28C to locate a target 40 and perform guidance independently. One particular example of this type of guidance is a laser semi-active homing (LSAH) which involves painting or otherwise designating the target 40, such as vehicle 21, with a designator beam 62 generated from a laser designator 58. According to one example, this laser designator 58 may be carried by an enemy vehicle 60 such as a helicopter, as depicted in FIGS. 6 and 7, or may be generated by a secondary source, such as a ground solider or other ground based installations. The LSAH threat 28C then may utilize the guidance sensor 30, which may be a forward-facing seeker, to detect the reflection of the designator beam 62 off of the target 40 to steer itself towards the target 40.

While designator beam 62 may originate from an enemy vehicle 60, such as a helicopter as shown in the figures, it will be understood that designator beam 62 may be generated from any suitable location operable to direct threat 28C towards the target vehicle 21. For example, designator beam 62 may originate from an enemy vehicle 60 which may also be the launcher 34 or launch platform for the threat 28C, or may be co-located with the launcher. According to another example, designator beam 62 may originate from a location remote from the launcher 34 of threat 28C.

Countermeasure system 10 may address this category of threat 28C, such as LSAH threats 28C, in one of two ways. A first method of countering such a threat 28C is illustrated in FIG. 6 wherein countermeasure system 10 may generate beam 26 in the direction of the threat 28C, thereby flooding or overwhelming the guidance sensor 30 and causing the threat 28C to miss the intended target 40. As shown in FIG. 6, threat 28C may veer in a separate direction away from target vehicle 21, for example, along the path indicated by arrow D causing threat 28C to overshoot the target 40 or alternatively along a path such as the path indicated by arrow E causing threat 28C to redirect into the ground surface 42.

A second method for dealing with LSAH threats 28C is depicted in FIG. 7 wherein countermeasure system 10 may direct beam 26 to a spot on the ground surface 42 away from the target vehicle 21. This spot may be known as a decoy spot 64 and may be matched to the wavelengths of the laser designator 58 and/or designator beam 62 to divert the attention of the guidance sensor 30 in threat 28C. This may cause threat 28C to interpret the decoy spot 64 as the target 40 location and may cause threat 28C to steer downwards towards the decoy spot 64 and into the ground surface 42. According to this method, the beam 26 may be more powerful than designator beam 62 and may take into account such factors as the angle of incidence of threat 28C to determine the proper placement of decoy spot 64 on the ground surface 42 remote from target vehicle 21. By utilizing tracking radar 12 information providing the bearing of the incoming threat 28C, the laser decoy spot 64 may be optimally placed on the ground 42 at an angle relative to the threat 28C to maximize the reflected energy reaching the threat 28C missile seeker (e.g. guidance sensor 30).

With continued reference to FIGS. 3-7, each of the described countermeasures employed by countermeasure system 10 integrate with the tracking radar 12 and the queuing sensor 16 in that the use of tracking radar 12 with the soft-kill countermeasures described herein enhances or otherwise allows each countermeasure to be effective against varying threats. In particular, tracking radar 12 may be first utilized to determine what type of threat 28 is being employed. As there are over 100 different known types of missile threats alone, it will be understood that a countermeasure designed for a specific threat type or threat category may not be particularly effective against other known threat 28 types. Accordingly, utilizing tracking radar 12 for threat detection may allow the target 40 to properly determine not only the category in which the threat 28 falls, e.g., SACLOS, beam-riding, or LSAH guidance systems, but also what specific type of threat 28 is being faced. For example, two different beam-riding threats 28B might fall into the same category, i.e., beam-riders, but one may utilize a four quadrant guidance signal 33B as described with the examples shown in FIGS. 4A, 4B, and 5, while a second beam-riding threat 28B may utilize a guidance signal 33B having three guidance regions in the guidance beam 33B. Further, the first threat 28B in this example may utilize red in one of the upper quadrants, such as first quadrant 44 or fourth quadrant 50, while the second threat 28B in this example may utilize red in one of the lower guidance beam 33B portions. Therefore, a countermeasure deploying a red laser beam 26 against the first threat 28B would cause that threat 28B to be steered into the ground surface 42 while a red laser beam 26 against the second threat 28B of this example would cause that threat 28B to be steered up and/or to the side, potentially into a less desirable position. Thus, it is important to know not only the category, i.e., the guidance method, used by a threat 28, but also the specific type and nature of the threat 28.

Tracking radar 12 may allow for this capability by conveying real time data to the processor 18 relating the elevation, velocity, flight pattern, spin rate, control surfaces, cross-section, size, and the like of the threat 28 immediately after the queuing sensor 16 detects the firing thereof. Then, tracking radar 12 may communicate this data to processor 18 which may utilize this real time data as a fingerprint of known threat types and may compare it to a prepopulated or pre-stored database of known threat types to determine what the threat is most likely to be. This process may narrow the incoming threat 28 down to a single or a small group of possible threats to better tailor the specific countermeasure to be employed by countermeasure system 10. This information may allow the countermeasure to be adjusted according to the threat type for elements such as beam size, beam color, beam frequency, beam position, polarization, or the like.

An additional feature enabled by the use tracking radar 12 within a soft-kill countermeasure system 10 is that previous soft-kill systems having only a queuing sensor 16 and the countermeasures themselves provide no information or confirmation that a threat 28 has defeated or otherwise avoided. Thus, previous soft-kill systems utilizing just a queuing sensor 16 and a soft-kill countermeasure are only capable of handling or addressing one threat 28 at a time as the countermeasure needs to be consistently and constantly applied for the maximum flight time of the threat 28. Further, as previous systems do not tend to include a threat identification action utilizing a tracking radar 12, the countermeasures employed may be ineffective for some threats with one of the few verifiable indications that a soft-kill countermeasure has failed being an impact of threat 28 on the target 40, which, for obvious reasons, may be less than desirable. The use of the tracking radar 12 may allow the countermeasure system 10 of the present disclosure to confirm a threat defeat which may allow the countermeasure system 20 to shift and address a second subsequent or simultaneous threat 28. The tracking radar 12 may allow for this confirmation through the radar data collected by looking for signs that the threat 28 is no longer active. For example, a threat 28 that has been successfully steered into the ground surface 42 and/or detonated thereon will no longer show up or appear on the tracking radar 12 at which point the countermeasure system 10 may redirect to a second subsequent or simultaneous threat 28.

With regards to SACLOS targets 28A, the tracking radar 12 enhances a soft-kill countermeasure for these types of threats 28A by utilizing the real time information to properly identify the threat 28A to customize the countermeasure to that particular threat 28A and to confirm that the threat 28A has been defeated.

With regards to beam-riding threats 28B, tracking radar 12 may allow for the countermeasure described herein in that tracking radar 12 may first allow for proper identification of a beam-riding threat 28B while also determining the specific type of beam-rider 28B that is being deployed. From here, the countermeasure may be tailored to utilize the proper wavelength or beam 26 parameter to guide the threat 28B in the desired direction. For example, where the threat 28B utilizes a guidance signal 33B with red light in the upper sections 44 and/or 50, the countermeasure deployed may utilize similar red light or red wavelength to steer threat 28B downwards along the path indicated by arrow C2 in FIG. 4B and into ground surface 42 as discussed previously herein. Additionally, tracking radar 12 may enhance this particular countermeasure in that the beam spot 54 is most effective when projected just behind the threat 28B such that the backscatter 56 overwhelms the guidance signal 33 at the guidance sensor 30. As seen in FIG. 4A, when the beam spot 54 is at a closer distance to the launcher 34 and signal generator 36, such as location L1, the backscatter 56 may be more diffuse and may not be powerful enough to immediately overcome the guidance signal 33B. Thus, as threat 28B moves towards the target vehicle 21, the ideal countermeasure would likewise move the beam spot 54 along the ground surface 42 behind the threat 28B. As shown in FIG. 4B, when the beam spot 54 then reaches a second location, such as L2, that is further from the launcher 34 and signal generator 36, the backscatter 56 may then overtake the guidance signal 33B and cause the threat 28B to veer into the ground surface 42 away from the target 40. Tracking radar 12 allows for countermeasure system 10 to account for whereabouts of threat 28B at all times, thus allowing for proper placement of beam spot 54 and movement thereof behind threat 28B as it moves towards target 40.

With regards to the LSAH threats 28C as depicted in FIGS. 6 and 7, the tracking radar 12 may enable or enhance the effective countermeasures according to the following: With reference to the countermeasure wherein beam 26 is aimed directly at the threat 28C to overwhelm or otherwise disable the threat 28C and the guidance sensor 30 carried thereon, tracking radar 12 allows for countermeasure system 10 to properly track the location and position of threat 28C to direct the beam 26 to the proper location; Where the chosen countermeasure deployed against LSAH targets 28C involve the use of a decoy spot 64 to direct the threat 28C into the ground surface 42, tracking radar 12 enhances this countermeasure by allowing countermeasure system 10 to determine the specific type of threat 28C, thus allowing further determination of the proper wavelength, angle of incidence, and/or decoy spot 64 position for beam 26 to be most effective in countering threat 28C.

Again all of these soft-kill countermeasures may be enhanced in that confirmation of the defeat of a threat 28 may allow for more rapid switching to secondary threat targets and/or further deployment of countermeasures where a threat 28 is detected as continuing. Further, the use of tracking radar 12 with soft-kill countermeasures, particularly in scenarios where a vehicle is equipped with both soft-kill and hard-kill countermeasure systems including countermeasure system 10 may allow for seamless integration thereof. Further, tracking radar 12 may be integrated with both soft-kill and hard-kill countermeasures, thus allowing immediate hard-kill response when it is determined that the soft-kill countermeasures were ineffective.

Figure 8A:
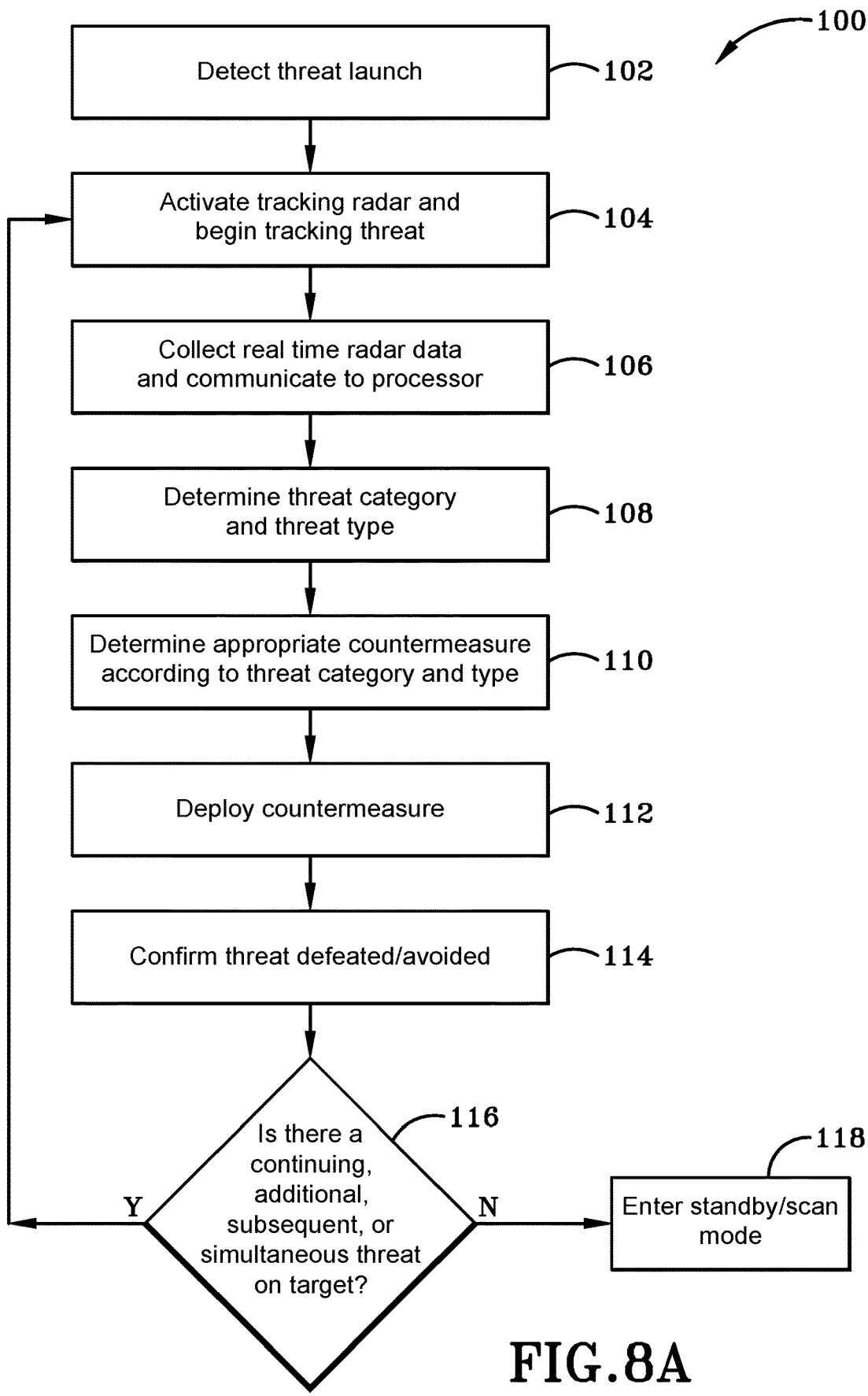
FIG. 8A (FIG. 8A) is an exemplary flow chart illustrating a first method of operation for a countermeasure system of the present disclosure.

With reference to FIG. 8A, a method of use for countermeasure system 10 shown by way of a representative flowchart and indicated as process 100. Process 100 is illustrated from the point of view of a target 40, such as a vehicle 21, in that process 100 will be understood to be the process undertaken to counter a threat 28 launched against the target 40 itself. Therefore, first, the target 40 may detect the launch of a threat 28 via the queuing sensor 16 or other optical detection device. The detection of the threat 28 launch is indicated as step 102 and may be accomplished by monitoring the surrounding regions around vehicle 21 for an emission of light or exhaust plume that typically accompanies the launching or firing of a threat 28. This flash of light is commonly referred to as muzzle flash.

Once a muzzle flash is detected by the queuing sensor 16, the tracking radar 12 may be activated and may orient towards the muzzle flash to begin tracking the threat 28, shown as step 104.

The tracking radar 12 may then begin to collect radar data relating to various real time information about the threat 28, including position, velocity, and the like. In step 106, these data are then provided in real time to the processor 18 to allow for identification of both the threat 28 category and the specific type of threat 28.

Next, in step 108, the processor 18 may determine both the threat 28 category and threat 28 type through the comparison of the radar data collected and provided to processor 18 in step 106 to a database of known threat types. Queueing sensors (such as queueing sensor 16) typically operate in the infrared, but, like visible light color digital cameras, may employ a color filter array to allow detection of two or more infrared "colors" in the captured image. Differences in the intensities of these infrared colors could be used to characterize the exhaust plume chemistry and narrow the list of possible threats. When countermeasure system 10 is equipped with a queueing sensor 16 having a color filter array, the radar data may be optionally combined with optical spectrum data obtained from the multi-color queueing sensor 16 focal plane arrays, which could further narrow the list of possible threats to identify the specific threat 28. This may allow processor 18 to further determine the best countermeasure to be deployed based on the specific threat type. This countermeasure determination is indicated in process 100 at step 110.

Once the appropriate countermeasure has been chosen in step 110, that countermeasure may be deployed by countermeasure system 10. As discussed herein, these countermeasures may include generating beam 26 from beam generator 14 and directing beam 26 to the appropriate position based on the threat type and chosen countermeasure. The deployment of the chosen countermeasure may be indicated as step 112.

While the chosen countermeasure is being deployed in step 112, the tracking radar 12 may continue to track the threat 28, providing real time information about the threat 28, including a defeat confirmation once it is determined that the threat 28 has been disabled or otherwise avoided. The threat defeat confirmation may be indicated as step 114 in process 100.

Throughout process 100, the countermeasure system 10 or more particularly queuing sensor 16 may continuously monitor for additional muzzle flashes to detect additional, subsequent, or simultaneous threats 28 against the target vehicle 21. Thus, once a threat 28 is defeated and a confirmation thereof is provided in step 114, countermeasure system 10 may perform a check for additional active threats 28 in the area. This threat check may be performed as step 116 in process 100. If an additional act of threat 28 is detected, the process 100 may repeat beginning with step 104 with tracking radar 12 now directing towards the additional threat 28 as depicted in FIG. 8A. If no additional acts of threat 28 are detected, the countermeasure system 10 may enter a standby or active scanning mode wherein the queuing sensor 16 continues to monitor for muzzle flashes and additional future threats 28, but wherein tracking radar 12 and other countermeasure system 10 assets are otherwise inactive.

Figure 8B:
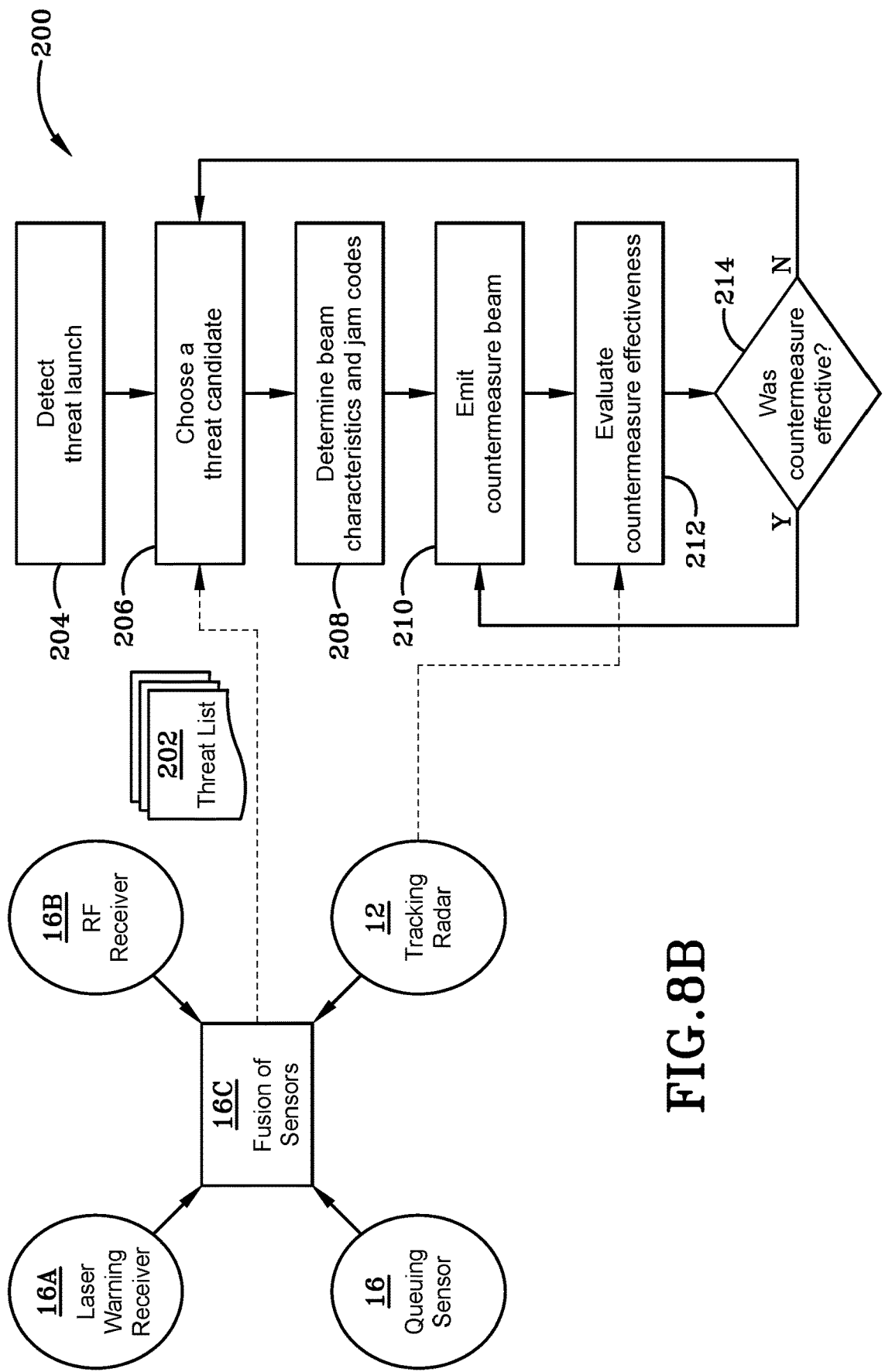
FIG. 8B (FIG. 8B) is an exemplary flow chart illustrating a second method of operation for a countermeasure system of the present disclosure.

According to another embodiment, as shown in FIG. 8B, process 200 may be employed by countermeasure system 10 according to the following. First, a list of multiple possible threats 28 in a threat list 202 that may be sorted by confidence level. Then once a launch is detected, show as step 204 a threat 28 candidate may be chosen in step 206. The threat 28 candidate is contemplated to be the first threat on the threat list 202 and may be chosen according to a fusion between the queuing sensor 16 and its various components (e.g. laser warning receiver 16A, RF receiver 16B, if equipped) and the tracking radar 12. This fusion of sensors is shown in FIG. 8B as reference 16C. The fusion of the sensors 16C may provide details to the processor 18 to allow the threat list 202 to be narrowed to only those threats 28 that match the profile of the detected threat 28, at which point the characteristics of the countermeasure beam 26 may be chosen, and any jam codes (i.e. patterns or waveforms of intensity modulation for the beam 26 may be determined according to a model of the first threat 28 in the threat list 202. The determination of beam 26 characteristics and jam codes is shown as step 208. Next, the countermeasure beam 26 may be emitted in step 210.

Once the countermeasure beam 26 is emitted in step 210, the tracking radar 12 may be employed to detect any deviations in the flight path of the threat 28 as a result of the countermeasure beam 26 as compared to the flight path of threat 28 prior to emitting beam 26. These data from the tracking radar 12 may then be used to evaluate the countermeasure effectiveness based on threat 28 flight trajectory changes. This evaluation may take place as step 212 in process 200. Countermeasure system 10 may then make a determination if the chosen countermeasure beam 26 is effective. This determination is shown as step 214 in process 200. If the chosen countermeasure is determined to be effective by the detection of a deviation in the flight path of the threat 28 via tracking radar 12, the countermeasure beam 26 may continue to be emitted as long as the tracking radar 12 continues to show an effect on the flight path trajectory of the threat 28, or until tracking radar 12 indicates that threat 28 is defeated.

If the chosen countermeasure is determined to be ineffective, a new threat 28 candidate may be chosen according to a model of the next threat 28 in the threat list 202 and a different countermeasure (e.g. with different beam 26 characteristics and/or jam codes) may be employed.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that are executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A soft-kill countermeasure system comprising:
   a queueing sensor operable to detect a launch of a projectile;
   a tracking radar having one or more antenna elements operable to locate and track the projectile;
   a processor in operative communication with the queueing sensor and tracking radar operable to determine a category and type of threat posed by the projectile from data collected by the tracking radar; and
   a beam generator operable to generate a beam of electromagnetic energy configured to counter the threat posed by the projectile; wherein the beam generator directs the beam to a spot on a ground surface away from a ground target to divert the projectile.

2. The system of claim 1 wherein the spot is a decoy spot forward of the projectile and the beam simulates a laser designator to divert the projectile to the decoy spot.

3. The system of claim 1 wherein the beam generator directs the beam to a spot on a ground surface wherein the spot is behind the projectile and the beam generates a backscatter to divert the projectile.

4. The system of claim 1 wherein the tracking radar is operable to communicate the position of the projectile and at least one of the elevation, velocity, flight pattern, spin rate, control surfaces, cross-section, and size of the projectile to the processor.

5. The system of claim 4 wherein the processor is further operable to compare the position of the projectile and the at least one of the elevation, velocity, flight pattern, spin rate, control surfaces, cross-section, and size of the projectile to a database of known threat types to determine the category and type of threat posed by the projectile.

6. The system of claim 1 wherein the processor is further operable to direct the beam generator to generate the beam of electromagnetic energy configured to counter the threat posed by the projectile automatically.

7. The system of claim 1 wherein the queueing sensor further comprises:
   an optical sensor operable to detect a muzzle flash from the launch of the projectile.

8. The system of claim 1 wherein the beam generator is further operable to generate the beam of electromagnetic energy in multiple bands of the electromagnetic spectrum.

9. The system of claim 1 wherein the tracking radar is operable to detect an effectiveness of the beam to divert the projectile.

10. The system of claim 1 wherein the beam generator further comprises:

a movable mounting system operable to move the beam generator to a plurality of positions relative to the mounting system.

11. The system of claim 10 wherein the laser beam is projectable in any direction relative to the mounting system of the beam generator.

12. The system of claim 11 wherein the laser beam is automatically generated in response to the threat posed by a projectile according to the determination of the threat category and threat type by the processor.

13. A method of deploying a soft-kill countermeasure comprising:
    detecting the launch of a threat via a queueing sensor;
    tracking the position of the threat via a tracking radar;
    communicating the position of the threat and at least one of the elevation, velocity, flight pattern, spin rate, control surfaces, cross-section, and size of the threat to a processor;
    determining, via the processor, the threat type according to the at least one of the elevation, velocity, flight pattern, spin rate, control surfaces, cross-section, and size of the threat;
    determining, via the processor a chosen countermeasure to be deployed according to the threat type and position of the threat;
    deploying the chosen countermeasure;
    evaluating the chosen countermeasure for effectiveness via the tracking radar; and
    deploying a different countermeasure if the chosen countermeasure is ineffective.

14. The method of claim 13 wherein deploying the chosen countermeasure further comprises:
    generating a beam of electromagnetic energy configured to counter the identified threat type via a beam generator.

15. The method of claim 14 further comprising:
    detecting a second threat via the queueing sensor;
    determining a threat type of the second threat via the tracking radar and processor;
    reconfiguring the beam of electromagnetic energy according to the second threat type; and
    redeploying the reconfigured beam of electromagnetic energy to a second position to counter the second threat.

16. The method of claim 15 wherein reconfiguring the beam of electromagnetic energy further comprises:
    adjusting one of the wavelength, frequency, size, position, and polarization of the beam.

17. The method of claim 13 further comprising:
    directing a beam to a spot on a ground surface away from a ground vehicle to divert the threat.

18. The method of claim 13 wherein tracking the threat via the tracking radar and communicating the position of the threat and the at least one of the elevation, velocity, flight pattern, spin rate, control surfaces, cross-section, and size of the threat to the processor is accomplished in real time.

19. A soft-kill countermeasure system comprising:
    a queueing sensor operable to detect a launch of a threat;
    a tracking radar operable to locate and track the threat;
    a processor in operative communication with the queueing sensor and tracking radar operable to determine a category and type of threat; and
    a soft-kill countermeasure configured to counter the threat.

20. The system of claim 19 wherein the tracking radar is operable to detect a successful defeat of the threat.

* * * * *